United States Patent
Xu

(10) Patent No.: US 10,693,871 B2
(45) Date of Patent: Jun. 23, 2020

(54) ACCOUNT INFORMATION OBTAINING METHOD, TERMINAL, SERVER AND SYSTEM

(71) Applicant: Tencent Technology (Shenzhen) Company Limited, Shenzhen (CN)

(72) Inventor: Dongcheng Xu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 497 days.

(21) Appl. No.: 15/630,764

(22) Filed: Jun. 22, 2017

(65) Prior Publication Data

US 2017/0302662 A1 Oct. 19, 2017

Related U.S. Application Data

(63) Continuation of application No. PCT/CN2016/079822, filed on Apr. 21, 2016.

(30) Foreign Application Priority Data

Apr. 29, 2015 (CN) .......................... 2015 1 0212985

(51) Int. Cl.
*H04L 29/06* (2006.01)
*G06F 16/00* (2019.01)
(Continued)

(52) U.S. Cl.
CPC .......... *H04L 63/0861* (2013.01); *G06F 16/00* (2019.01); *G06F 21/32* (2013.01);
(Continued)

(58) Field of Classification Search
CPC combination set(s) only.
See application file for complete search history.

(56) References Cited

U.S. PATENT DOCUMENTS

2010/0148922 A1* 6/2010 Yamada ............... G06F 21/32
340/5.82
2011/0126280 A1* 5/2011 Asano .................. G06F 21/32
726/19
(Continued)

FOREIGN PATENT DOCUMENTS

CN 101222446 A 7/2008
CN 102073807 A 5/2011
(Continued)

OTHER PUBLICATIONS

Tencent Technology, ISRWO, PCT/CN2016/079822, Jul. 21, 2016, 8 pgs.
(Continued)

*Primary Examiner* — Philip J Chea
*Assistant Examiner* — Mohammed Ahmed
(74) *Attorney, Agent, or Firm* — Morgan, Lewis & Bockius LLP

(57) ABSTRACT

An account information obtaining method performed at a terminal includes the following steps: in response to a request of a current user of the terminal, invoking a social networking application running on the terminal to obtain biological information of a target user; extracting biological feature data from the biological information, and sending the biological feature data to a server; receiving, from the server, account information of the target user whose at least one associated biological feature data sample matches the biological feature data, and displaying the account information on the terminal; and in response to a selection of the account information by the current user of the terminal, adding the account information to a contact list of the current user's account at the social networking application so that the current user can communicate with the target user directly.

17 Claims, 11 Drawing Sheets

(51) Int. Cl.
*G06K 9/00* (2006.01)
*G06F 21/32* (2013.01)
*H04L 12/58* (2006.01)

(52) U.S. Cl.
CPC ........ *G06K 9/00885* (2013.01); *H04L 51/046* (2013.01); *H04L 51/32* (2013.01); *G06K 9/00892* (2013.01)

(56) References Cited

U.S. PATENT DOCUMENTS

| | | | | |
|---|---|---|---|---|
| 2013/0047229 A1* | 2/2013 | Hoefel | ................ | G06F 21/629 726/7 |
| 2013/0185354 A1* | 7/2013 | Seligstein | ............. | G06Q 50/01 709/204 |
| 2013/0246388 A1* | 9/2013 | Benini | ............... | G07C 9/00158 707/706 |
| 2013/0251213 A1* | 9/2013 | Nada | ................. | G06K 9/00006 382/116 |
| 2014/0074939 A1* | 3/2014 | Zhang | .................... | H04L 51/32 709/204 |
| 2014/0269614 A1* | 9/2014 | Maguire | ................ | H04L 51/32 370/331 |
| 2015/0358318 A1* | 12/2015 | Spio | ................... | H04L 63/0861 726/7 |
| 2017/0302662 A1* | 10/2017 | Xu | .......................... | H04L 51/32 |
| 2018/0232570 A1* | 8/2018 | Huang | ..................... | G06K 9/46 |

FOREIGN PATENT DOCUMENTS

| | | |
|---|---|---|
| CN | 103886204 A | 6/2014 |
| KR | 101433079 B1 | 8/2014 |
| KR | 20150011046 B1 | 1/2015 |

OTHER PUBLICATIONS

Tencent Technology, IPRP, PCT/CN2016/079822, Oct. 31, 2017, 7 pgs.

\* cited by examiner

ACCOUNT INFORMATION OBTAINING METHOD, TERMINAL, SERVER AND SYSTEM

PRIORITY CLAIM AND RELATED APPLICATION

This application is a continuation application of PCT Patent Application No. PCT/CN2016/079822, entitled "ACCOUNT INFORMATION ACQUISITION METHOD, TERMINAL, SERVER AND SYSTEM" filed on Apr. 21, 2016, which claims priority to Chinese Patent Application No. 201510212985.9, entitled "ACCOUNT INFORMATION OBTAINING METHOD, TERMINAL, SERVER, AND SYSTEM" filed on Apr. 29, 2015, both of which are incorporated by reference in their entirety.

FIELD OF THE TECHNOLOGY

The present disclosure relates to the field of Internet technologies, and in particular, to an account information obtaining method, terminal, server, and system.

BACKGROUND OF THE DISCLOSURE

With the development of application platforms, increasing users install applications on mobile terminals, and perform interactive operations, such as communication, file sharing, and message posting, by using the applications. On an application platform, when a current user needs to obtain account information of a particular target user, the current user first needs to obtain an account number of the target user. A common method is to directly enter the account number of the target user in an account query window bar. However, because the account number is generally a combination of a string of digits and/or letters, it is much inconvenient to remember the account number. Especially when a redundant account number is encountered, it is troublesome to enter the account number. Currently, many applications are provided with a fast account query function. For example, in a "people nearby" account query manner, account information of a user around that has logged in is found through network location, and is provided to the current user. Alternatively, in a "shake" account query manner, the current user and the target user simultaneously shake mobile terminals, and a server sends account information corresponding to mobile terminals that are simultaneously shaken to the current user and the target user. Alternatively, in an "import from address book" account query manner, account information associated with a communication number (for example, a phone number) in an address book is sent to the current user. However, among these manners, some require the target user to provision location information of the target user, some require the target user to carry the mobile terminal, and some require the current user to first obtain a communication number of the target user. Therefore, a direct and efficient manner is lacked currently, to obtain the application account information of the target user.

SUMMARY

Embodiments of the present invention provide an account information obtaining method, terminal, server, and system, so that application account information of a target user can be obtained conveniently and fast.

An embodiment of the present invention provides an account information obtaining method, including the following steps:
  receiving an account information obtaining instruction, and obtaining biological information of a target user;
  extracting biological feature data from the biological information, and sending the biological feature data to a server; and
  receiving account information that is sent by the server and that is associated with at least one biological feature data sample matching the biological feature data, and displaying the account information.

An embodiment of the present invention further provides an account information obtaining method, including the following steps:
  receiving biological feature data of a target user that is sent by a terminal;
  searching a database for at least one biological feature data sample that matches the biological feature data;
  obtaining account information associated with the biological feature data sample; and
  sending the associated account information to the terminal for display.

An embodiment of the present invention further provides an account information obtaining method, including the following steps:
  receiving, by a terminal, an account information obtaining instruction, obtaining biological information of a target user, extracting biological feature data from the biological information, and sending the biological feature data to a server;
  searching, by the server, a database for at least one biological feature data sample that matches the biological feature data;
  obtaining, by the server, account information associated with the biological feature data sample, and sending the associated account information to the terminal; and
  displaying, by the terminal, the account information.

An embodiment of the present invention further provides an account information obtaining terminal, including:
  an obtaining module, configured to receive an account information obtaining instruction, and obtain biological information of a target user;
  an identification module, configured to extract biological feature data from the biological information;
  a network module, configured to send the biological feature data to a server; and receive account information that is sent by the server and that is associated with at least one biological feature data sample matching the biological feature data; and
  a display module, configured to display the account information.

An embodiment of the present invention further provides an account information obtaining server, including:
  a network module, configured to receive biological feature data of a target user that is sent by a terminal; and send associated account information to the terminal for display; and
  a match module, configured to search a database for at least one biological feature data sample that matches the biological feature data; and obtain the account information associated with the biological feature data sample.

An embodiment of the present invention further provides an account information obtaining system, including a terminal and a server, the terminal being configured to receive an account information obtaining instruction, obtain biological information of a target user, extract biological feature data from the biological information, send the biological feature data to the server; and display associated account information; and the server being configured to search a database for at least one biological feature data sample that matches the biological feature data; obtain the account information associated with the biological feature data sample, and send the associated account information to the terminal.

In the embodiments of the present invention, a biological feature of a target user is identified to obtain account information associated with biological information. A tedious account number does not need to be entered, the target user does not need to carry a terminal, and the association between the biological information and the account information makes it more direct and convenient and faster for an application to find the account information.

DESCRIPTION OF EMBODIMENTS

The functional features and advantages of the present disclosure will be further illustrated with reference to the accompanying drawings by using embodiments. It should be understood that the specific embodiments described herein are merely intended to explain the present disclosure but are not intended to limit the present disclosure.

Figure 1:
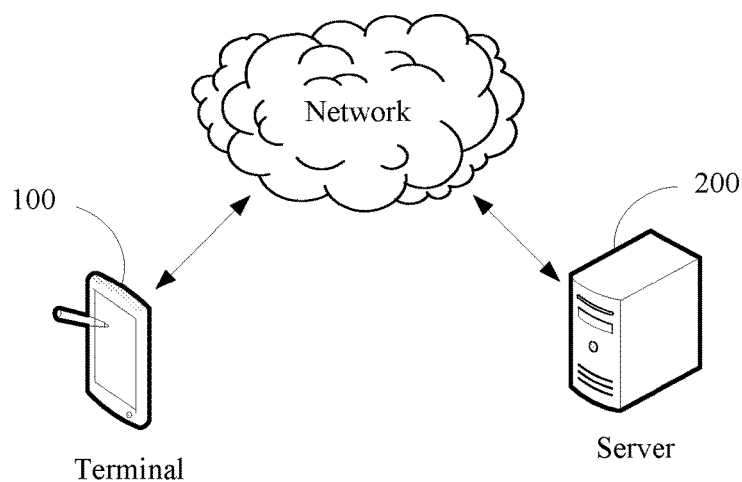
FIG. 1 is a schematic diagram of an account information obtaining system according to an embodiment of the present invention.

FIG. 1 is a schematic diagram of an account information obtaining system according to an embodiment of the present invention. Referring to FIG. 1, the system includes a terminal 100 and a server 200. In the embodiment shown in FIG. 1, the terminal 100 may be a computer, a PAD, a mobile phone, or the like, and the server 200 may be an application server.

For the embodiment shown in FIG. 1, a current user identifies biological information of a target user by using the terminal 100, to search for account information corresponding to the biological information. The biological information may include one or a combination of face image information, fingerprint information, iris information, and voice information. After obtaining the biological information of the target user, the terminal 100 sends biological feature data extracted from the biological information to the server 200 by using a network. The server 200 searches a database for a biological feature data sample that matches the biological feature data and account information that is associated with the biological feature data sample, and returns the associated account information to the terminal 100 by using the network.

In an embodiment, the target user needs to first associate the biological information of the target user with the account information of the target user, and then the biological information can be provided to the current user, so that the current user identifies the biological information to search for the account information of the target user. First, a terminal of the target user receives an account information association instruction, obtains to-be-associated biological information of the target user, extracts biological feature data from the to-be-associated biological information, and sends the account information of the target user and the biological feature data extracted from the to-be-associated biological information to the server 200. Then the server 200 associates the account information of the target user with the to-be-associated biological feature data, and stores them in the database.

Figure 2:
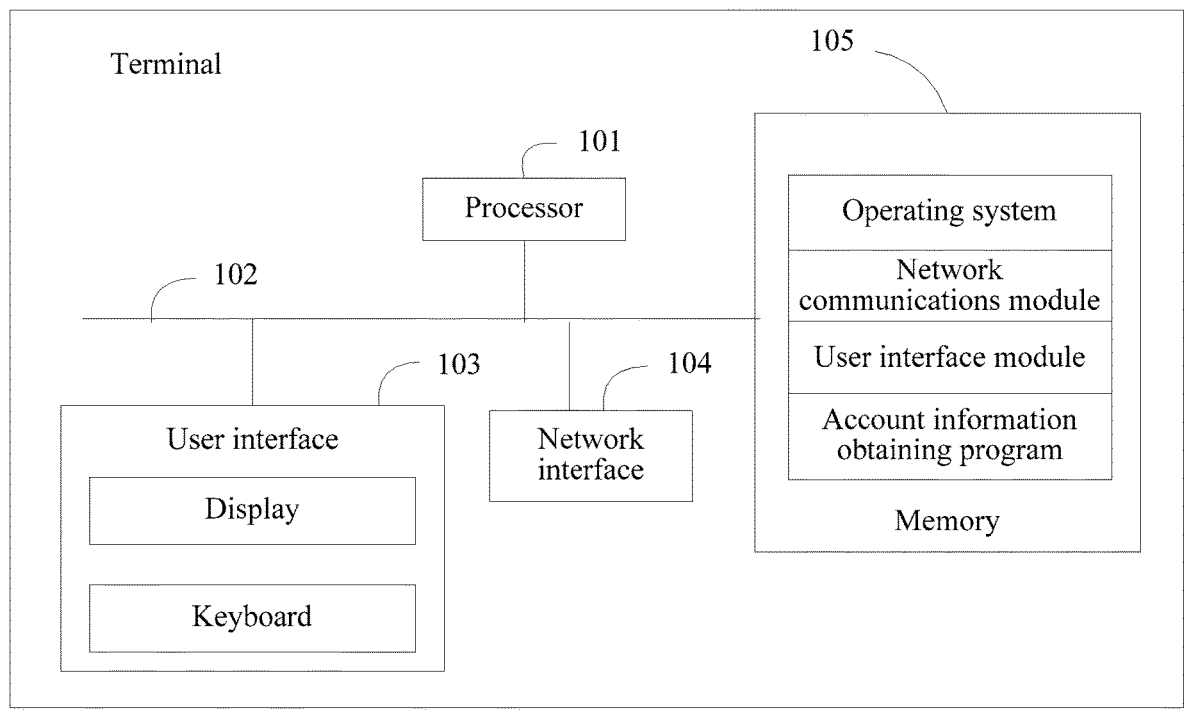
FIG. 2 is a schematic bus diagram of an account information obtaining terminal according to an embodiment of the present invention.

FIG. 2 is a schematic bus diagram of an account information obtaining terminal according to an embodiment of the present invention. Referring to FIG. 2, the terminal 100 may include: at least one processor 101, for example, a CPU, at least one network interface 104, a user interface 103, a memory 105, and at least one communications bus 102. The communications bus 102 is configured to implement connection and communication between the components. The user interface 103 may include a display and a keyboard, and may further include a standard wired interface and wireless interface. The network interface 104 may include a standard wired interface and wireless interface (for example, a WIFI interface). The memory 105 may be a high-speed RAM, or may be a non-volatile memory, for example, at least one magnetic disk storage. The memory 105 may be at least one storage apparatus that is located far away from the processor 101. As a computer storage medium, the memory 105 may include an operating system, a network communications module, a user interface module, and an account information obtaining program.

In the account information obtaining terminal shown in FIG. 2, the network interface 104 is mainly configured to connect to a server or another terminal, and perform data communication with the server or the another terminal; the user interface 103 is mainly configured to receive an instruction of a current user, and interact with the current user; and the processor 101 may be configured to invoke the account information obtaining program stored in the memory 105, to execute the following operations:

receiving an account information obtaining instruction by using the user interface 103, and obtaining biological information of a target user;

extracting biological feature data from the biological information, and sending the biological feature data to a server by using the network interface 104; and receiving, by using the network interface 104, account information that is sent by the server and that is associated with at least one biological feature data sample matching the biological feature data, and displaying the account information by using the user interface 103.

In an embodiment, the processor 101 may further invoke the account information obtaining program stored in the memory 105 to execute the following operations:

receiving an account information association instruction by using the user interface 103, and obtaining to-be-associated biological information of the current user;

extracting to-be-associated biological feature data from the to-be-associated biological information; and sending, by using the network interface 104, account information of the current user and the to-be-associated biological feature data to the server for association.

This helps another user to identify biological information of the current user to search for the account information of the current user.

In an embodiment, to enable the current user to obtain account information of the target user, a terminal of the target user needs to first associate the biological information of the target user with the account information of the target user. Specifically, the terminal of the target user receives an account information association instruction, obtains to-be-associated biological information of the target user, extracts biological feature data from the to-be-associated biological information, and sends the account information of the target user and the biological feature data extracted from the to-be-associated biological information to the server. Then the server associates the account information of the target user with the to-be-associated biological feature data, and stores them in a database.

With the account information obtaining terminal, server, and system described in the embodiments of FIG. 1 and FIG. 2, biological information of a target user is identified to obtain account information associated with the biological information. A tedious account number does not need to be entered, the target user does not need to carry a terminal, and the association between the biological information and the account information makes it more direct and convenient and faster for an application to find the account information.

Figure 3:
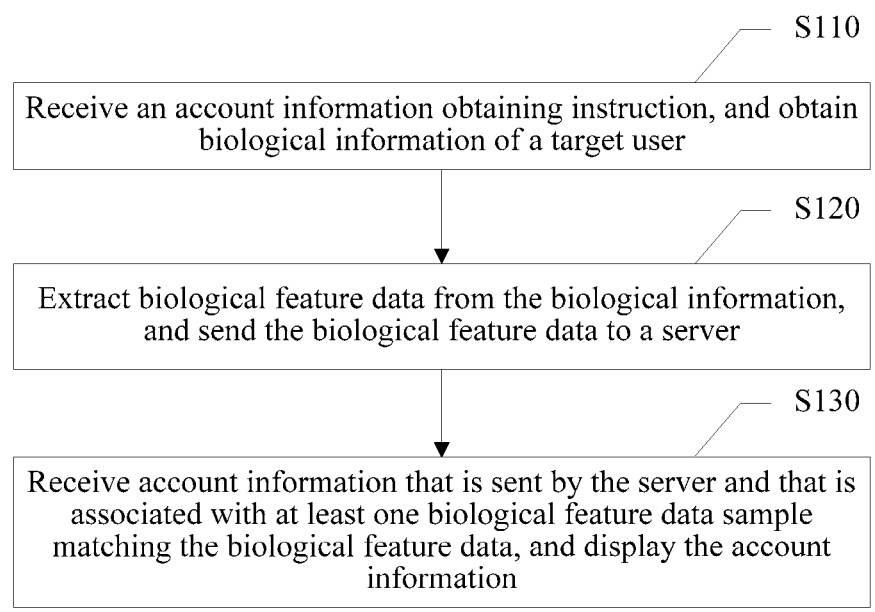
FIG. 3 is a flowchart of an account information obtaining method implemented by using a terminal according to an embodiment of the present invention.

FIG. 3 is a flowchart of an account information obtaining method implemented by using a terminal according to an embodiment of the present invention. As shown in FIG. 3, the account information obtaining method provided in this embodiment includes:

Step S110: Receive an account information obtaining instruction, and obtain biological information of a target user.

Assuming that two users, a current user and a target user, both have user accounts at a social networking application (e.g., WeChat) but these two users are not connected to each other. When the two users meet each other and decide to connect to each other so that each one can add the other user to its contact list and they can communicate with each other directly in the future. In this embodiment, rather than type in the other's user name at the social networking application (which could be very long or difficult to remember), the current user may select a "scan" operation control among function options of an application, to trigger the account information obtaining instruction. Alternatively, an "obtain target user biological information" control is preset in an account information view window, and the current user may select the "obtain target user biological information" control, to trigger the account information obtaining instruction. The biological information may include one or a combination of face image information, fingerprint information, iris information, and voice information, and the preset "obtain target user biological information" control may include photographing, recording, and other controls. There are many manners for obtaining the biological information of the target user. For example, stored biological information of the target user, including a face picture, a fingerprint picture, an iris picture, a voice recording, and the like, is directly selected from a memory of the terminal. Alternatively, biological information of the target user, such as a face picture, a fingerprint picture, or an iris picture, is photographed by using a camera. Alternatively, voice of the target user is received by using a microphone. Alternatively, a camera shoots a video of the target user, and then a face picture that can clearly reflect features of the five sense organs of the target user, or a fingerprint picture reflecting a fingerprint feature, or an iris picture reflecting an iris feature is extracted from the video, or voice of the target person is extract from the video.

Step S120: Extract biological feature data from the biological information, and send the biological feature data to a server.

A biological information identification program in the terminal may identify the obtained biological information, and extract clear biological feature data. The biological feature data may include features of the five sense organs, a facial form, a fingerprint pattern, an iris feature, a voice frequency, a tone, and the like. If the biological feature data in the biological information is not clear enough, the program may prompt the user that the identification and extraction fail, request the user to re-obtain biological information, and return to an interface for obtaining the biological information of the target user. After the biological feature data extraction is completed, the terminal sends the biological feature data to an application server by using the Internet. To improve application security, the biological feature data may be encrypted before sent, and then uploaded to the server.

Step S130: Receive account information that is sent by the server and that is associated with at least one biological feature data sample matching the biological feature data, and display the account information.

The server stores a large number of biological feature data samples, and one or more biological feature data sample are associated with one piece of account information. The server searches for a matched biological feature data sample according to the biological feature data uploaded by the terminal. As long as the target user has associated the biological information of the target user with account information of the target user in advance, the server can find a matched biological feature data sample. Considering that people may look similar, there may be more than one search result. The server returns account information associated with the matched biological feature data sample to the terminal. If there is only one matched biological feature data sample, the server returns one piece of account information. If there are multiple matched biological feature data samples, the server returns account information associated with all the matched biological feature data samples to the terminal. If the server finds no matched biological feature data sample according to the biological feature data, the server returns match failure information to the terminal, to prompt the current user to re-obtain biological information. After receiving the account information, the terminal displays the account information on an account information query interface for view by the current user. The account information may include information about a target user to be added, such as an account number, a nickname, a brief introduction, and a photo. The current user determines, according to the displayed account information, whether there is an expected target user. If the current user does not find account information of an expected target user in the displayed account information, current addition is canceled, and biological information is re-obtained.

In this embodiment, biological information of a target user is identified to obtain account information associated with the biological information. A tedious account number does not need to be entered, the target user does not need to carry a terminal, and the association between the biological information and the account information makes it more direct and convenient and faster for an application to find the account information. Using the social networking application as an example, when the current user and the target user meet for the first time, they are interested in adding each other to their contact list. According to some embodiment of this application, the current user points his terminal at the target user (or more specifically the target user's face) and asks the target user to say a few words about himself, e.g., his name, school and/or job, etc., while invoking the social networking application running on the terminal to capture a video of the target user along with an audio of the target user simultaneously. One or more image frames are extracted from the video for generating unique facial characters of the target user and one or more sound frames are extracted from the audio for generating unique acoustic fingerprints of the target user. Both types of biological information of the target user are then submitted to a remote server of the social networking application (assuming that the target user has already registered his biological information such as facial characters and/or acoustic fingerprints with his user account at the server). By comparing the biological information provided by the terminal with the biological information stored at the server's user account database, the server can find the target user's user account matching the biological information provided by the terminal and return the target user's user account information to the terminal so that the current user can add the target user's account information to the current user's contact list, e.g., by sending a connection request back to the server including the two user accounts' information. In some implementations, the current user may associate the video and/or audio of the target user captured by the terminal or a subset thereof like an image frame of the target user's face with the target user's user account (e.g., in the form of an alias or a name icon) for recognizing the target user on the terminal. By doing so, it is easier for the current user to remember the target user in the future since the video and audio are the first impression the target user leaves upon the current user. In other words, the current user can choose some type of biological information associated with the target user that he is most familiar with as an alias of the target user on his contact list. In some embodiments, the biological information collected by the current user for recognizing the target user is usually something readily available for the public such as video or audio of the target user, not the more private biological information such as fingerprint that might be used by the target user for accessing his own user account at the social networking application or unlocking his own mobile terminal. But given the fact that different people may have similar facial characters or acoustic fingerprints, as will be described below, multiple types of biological information may be used by the server for accurately pinpointing the target user within its user account database.

Figure 4:
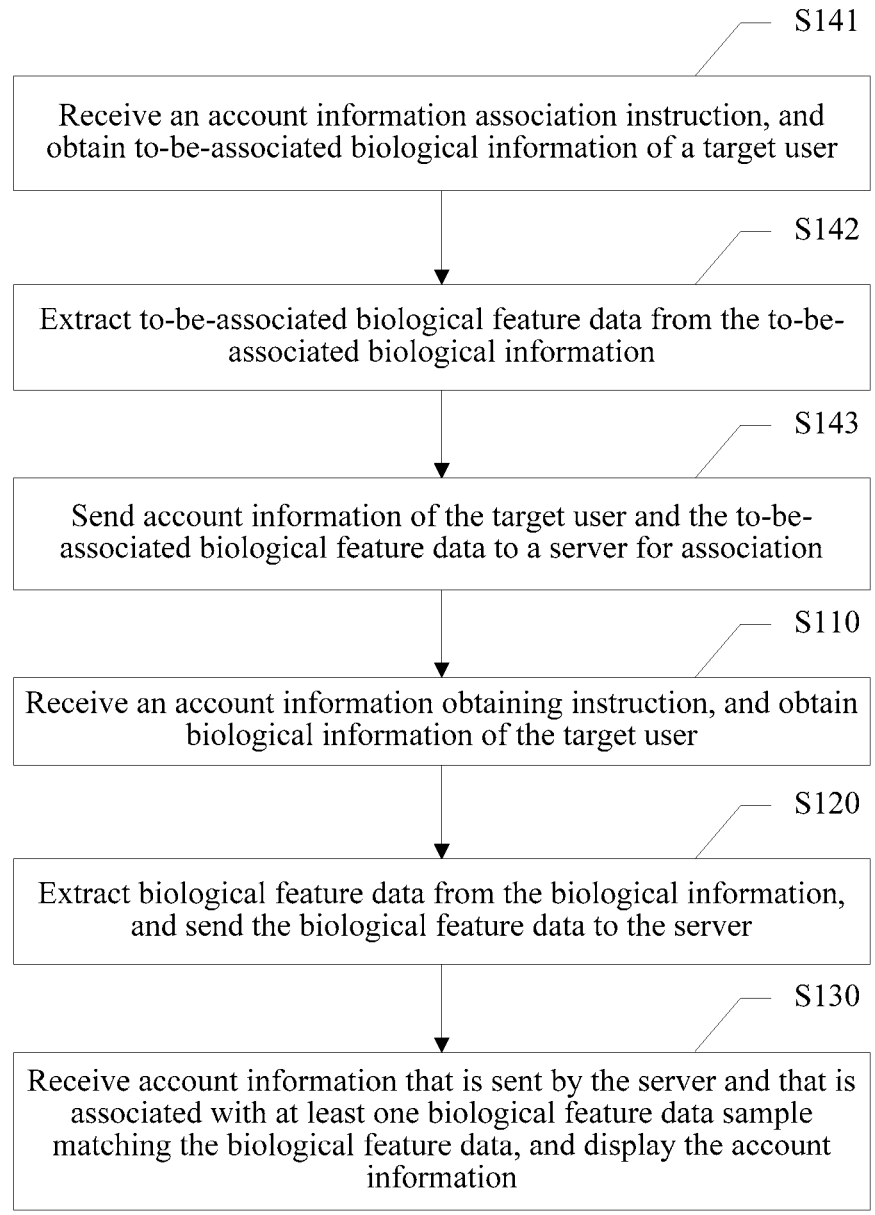
FIG. 4 is a flowchart of an account information obtaining method implemented by using a terminal according to an embodiment of the present invention.

FIG. 4 is a flowchart of an account information obtaining method implemented by using a terminal according to an embodiment of the present invention. As shown in FIG. 4, this embodiment includes all the steps in the embodiment shown in FIG. 3, and to enable the current user to identify the biological information of the target user to search for the account information of the target user, before step S110, further includes a step of associating, by a terminal of the target user, the account information of the target user with the biological feature data of the target user, which specifically includes:

Step S141: Receive an account information association instruction, and obtain to-be-associated biological information of the target user.

In this embodiment, to enable another user to identify the biological information of the target user to obtain account information associated with the biological information, the terminal of the target user first needs to associate the biological information of the target user with the account information of the target user. A biological information association operation control is preset on an application interface, and the account information association instruction is triggered after the user selects the control. Alternatively, the account information association instruction may be directly triggered by using a "scan" control. To distinguish from the account information obtaining instruction, after the user selects the "scan" control and biological information is obtained, a selection menu including a "search for account information" option and an "associate account information" option is popped. When the user selects the "search for account information" option, the account information obtaining instruction is triggered. When the user selects the "associate account information" option, the account information association instruction is triggered. The manner for obtaining the to-be-associated biological information may be the same as the manner for obtaining the biological information of the target user in the foregoing embodiment. For example, biological information of the user is directly selected from a memory of the terminal. Alternatively, biological information of the user, such as the face, a fingerprint, or an iris, is photographed by using a camera. Alternatively, voice of the user is received by using a microphone. Alternatively, a camera shoots a video of the user, and then face information that can most clearly reflect the five sense organs of the user, fingerprint information, iris information, or voice information is extract from the video.

Step S142: Extract to-be-associated biological feature data from the to-be-associated biological information.

To make subsequent biological information search and match processes simpler and faster, multiple pieces of to-be-associated biological information may be provided during account information association. For example, face images photographed at different angles are provided, which can reflect three-dimensional face features of the user more comprehensively. A biological information identification program in the terminal identifies the to-be-associated biological, and extracts clear biological feature data. The biological feature data may include features of the five sense organs, a facial form, a fingerprint, an iris, a voice frequency, a tone, and the like. If there are multiple pieces of to-be-associated biological information, multiple pieces of biological feature data are extracted correspondingly. If a feature in the biological information is not clear enough, the program may prompt the user that the identification and extraction fail, request the user to re-obtain biological information, and return to an interface for obtaining to-be-associated biological information.

Step S143: Send the account information of the target user and the to-be-associated biological feature data to the server for association.

After the biological feature data extraction is completed, the target user sends the account information of the target user and the to-be-associated biological feature data to the application server by using the terminal, and the server associates the account information of the target user and the biological feature data and stores them. If there are multiple pieces of to-be-associated biological feature data, the multiple pieces of biological feature data are all associated with account information of a same user. The multiple pieces of biological feature data reflect biological information of the same user, making subsequent match more accurate.

In an embodiment, to enable another user to identify biological information of the current user to search for account information of the current user, the biological information of the current user may be associated with the account information of the current user. Specifically, the terminal of the current user receives an account information association instruction, obtains to-be-associated biological information of the current user, extracts biological feature data from the to-be-associated biological information, and sends the account information of the current user and the biological feature data extracted from the to-be-associated biological information to the server. Then the server associates the account information of the current user with the to-be-associated biological feature data, and stores them in a database.

Figure 5:
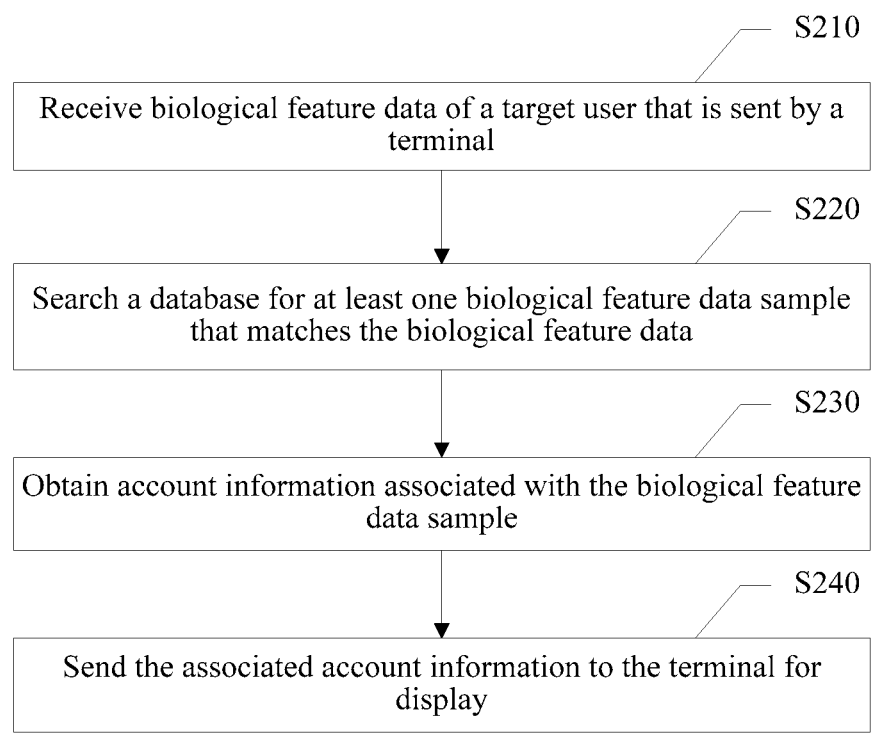
FIG. 5 is a flowchart of an account information obtaining method implemented by using a server according to an embodiment of the present invention.

FIG. 5 is a flowchart of an account information obtaining method implemented by using a server according to an embodiment of the present invention. As shown in FIG. 5, the account information obtaining method provided in this embodiment includes:

Step S210: Receive biological feature data of a target user that is sent by a terminal.

In this embodiment, after receiving biological feature data sent by a terminal, an application server searches a database for account information associated with the biological feature data. If the biological feature data received from the terminal are encrypted data, the server first performs decryption processing on the encrypted data.

Step S220: Search a database for at least one biological feature data sample that matches the biological feature data.

The database of the server stores a large number of biological feature data samples, and one or more biological feature data sample are associated with one piece of account information. The server searches for a matched biological feature data sample according to the biological feature data uploaded by the terminal. As long as the target user has associated the biological information of the target user with account information of the target user in advance, the server can find a matched biological feature data sample. Considering that people may look similar, there may be more than one search result.

Step S230: Obtain account information associated with the biological feature data sample.

When only one matched biological feature data sample is found, the server searches the database for account information associated with the biological feature data sample. When multiple matched biological feature data samples are found, the server searches account information associated with all the matched biological feature data samples one by one.

Step S240: Send the associated account information to the terminal for display.

The server returns one or more pieces of associated account information that are found to the terminal by using a network. A current user determines, according to the returned account information, whether there is account information of an expected target user. If the server finds no matched biological feature data sample according to the biological feature data, the server returns match failure information to the terminal, to prompt the current user to re-obtain biological information.

In this embodiment, a server searches for account information associated with biological information of a target user. A current user does not need to enter a tedious account number, the target user does not need to carry a terminal, and the association between the biological information and the account information makes it more direct and convenient and faster for an application to find the account information.

Figure 6:
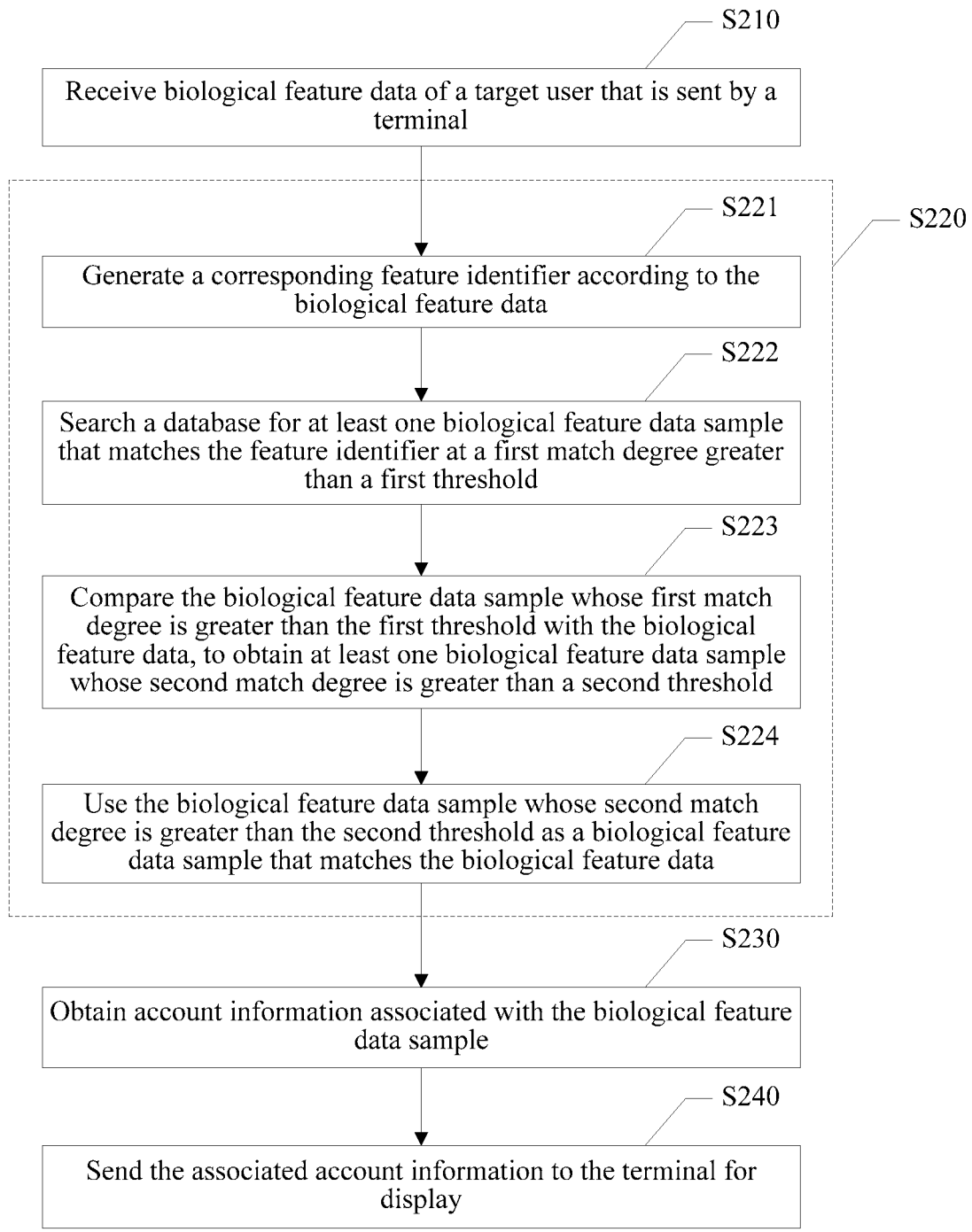
FIG. 6 is a flowchart of an account information obtaining method implemented by using a server according to an embodiment of the present invention.

FIG. 6 is a flowchart of an account information obtaining method implemented by using a server according to an embodiment of the present invention. As shown in FIG. 6, this embodiment includes all the steps in the embodiment shown in FIG. 5, and describes in detail the step of searching for a biological feature data sample that matches the biological feature data. Therefore, step S220 includes:

Step S221: Generate a corresponding feature identifier according to the biological feature data.

In this embodiment, to improve a match speed, the server first performs, in advance in a fast match manner, preliminary screening on the large number of biological feature data samples in the database, to narrow a match range. Using face feature data as an example, the server extracts several key coordinates in the face feature data (for example, coordinates of the five sense organs or coordinates of the face contour), and generates a feature identifier (for example, a character string consisting of values of the coordinates); or extracts shape and size data of several features in the face feature data (for example, a facial form includes a round face, a square face, and an oval face, shapes of the five sense organs include round eyes, seamed eyes, a small mouse, a big mouse, a low bridged nose, and a high bridged nose), and generates a feature identifier (for example, a particular character is used to represent a feature of a shape, and characters of multiple features form a character string).

Step S222: Search the database for at least one biological feature data sample that matches the feature identifier at a first match degree greater than a first threshold.

For a biological feature data sample in the database, the server may also use the foregoing manner to generate a sample feature identifier, compare the sample feature identifier with the to-be-matched feature identifier, to obtain a first match degree, and when the first match degree is higher than a preset first threshold, for example, the sample feature identifier is similar to the to-be-matched feature identifier more than 80%, retain the biological feature data sample for subsequent detailed comparison.

Step S223: Compare the biological feature data sample whose first match degree is greater than the first threshold with the biological feature data, to obtain at least one biological feature data sample whose second match degree is greater than a second threshold. In some embodiments, the biological feature data sample whose second match degree is greater than the second threshold is chosen by the end user of a terminal that submits the biological feature data. For example, multiple biological feature data samples whose first match degree are greater than the first threshold are returned to the terminal and displayed to the end user. Since the end user can access additional information to determine which one matches the biological feature data (e.g., consulting with the actual person or reviewing the picture he or she scans to generate the biological feature data), it is likely that the user can make a more accurate determination than a computer program or at least supplement the determination by the computer program. In response to the user's selection, the terminal returns the user-selected biological feature data sample to the server as the one whose second match degree is greater than the second threshold. In some embodiments, the server accepts the user-selected biological feature data sample and uses it to update its own biological feature processing model to further improve its accuracy using many known machine learning techniques.

Step S224: Use the biological feature data sample whose second match degree is greater than the second threshold as a biological feature data sample that matches the biological feature data.

After the range is narrowed, a detailed comparison manner is used. For example, biological feature data samples obtained after the preliminary screening are compared with the biological feature data sent by the terminal one by one by using a face recognition technology, a fingerprint recognition technology, an iris recognition technology, or a voice recognition technology, to search for a biological feature data sample having a higher similarity degree respect to the biological feature data. Considering that it is impossible for the user to photograph identical pictures when photographing face pictures, fingerprint pictures, or iris pictures of the target user, or during obtaining of voice of the target user, voice of the target user may be different from that before, which may be caused by impact from an external environment or impact from the target user, in this embodiment, the second threshold is used as a comparison criterion, and when the second match degree is higher than the second threshold, for example, higher than 95%, it is considered that the biological feature data sample matches the biological feature data sent by the terminal.

In this embodiment, a server first uses a fast match manner to perform preliminary screening, which narrows a match range, and improves a match speed, and then the server uses a detailed comparison manner to obtain a biological feature data sample having a great similarity degree, making match more accurate.

Figure 7:
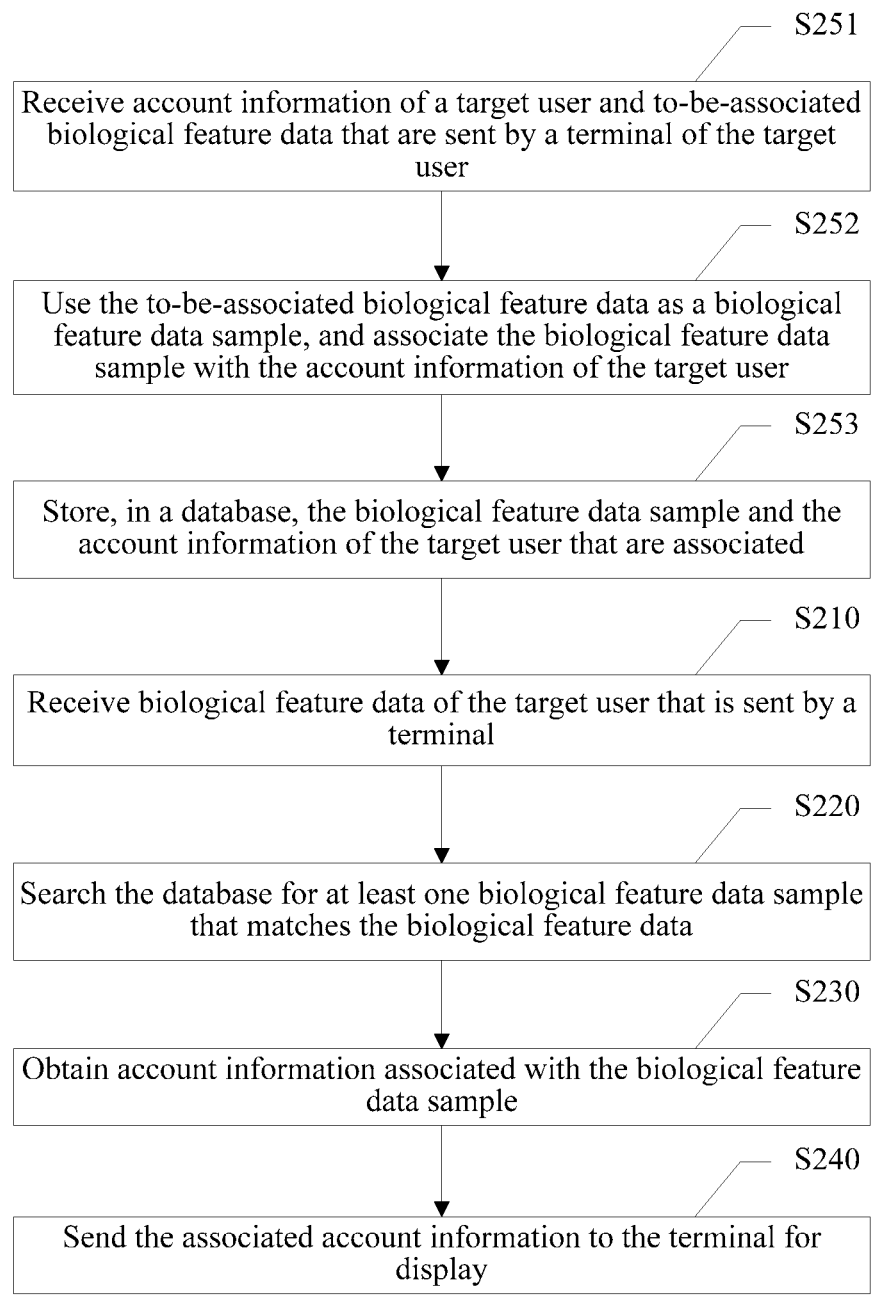
FIG. 7 is a flowchart of an account information obtaining method implemented by using a server according to an embodiment of the present invention.

FIG. 7 is a flowchart of an account information obtaining method implemented by using a server according to an embodiment of the present invention. As shown in FIG. 7, this embodiment includes all the steps in the embodiment shown in FIG. 5, and to enable a current user to identify the biological information of the target user to search for the account information of the target user, before step S210, further includes a step of associating the account information of the target user with the biological feature data of the target user, which specifically includes:

Step S251: Receive the account information of the target user and to-be-associated biological feature data that are sent by a terminal of the target user.

Step S252: Use the to-be-associated biological feature data as a biological feature data sample, and associate the biological feature data sample with the account information of the target user.

Step S253: Store, in the database, the biological feature data sample and the account information of the target user that are associated.

In this embodiment, to enable another user to identify the biological information of the target user to obtain the account information associated with the biological information, the target user first needs to send, by using a terminal, to-be-associated biological feature data extracted from to-be-associated biological information of the target user and the account information of the target user to the server for association. To make subsequent biological information search and match processes simpler and faster, the terminal may provide one piece of account information and multiple pieces of to-be-associated biological feature data to the server. The multiple pieces of biological feature data reflect biological information of the same user, making subsequent match more accurate. The server associates the account information and the one or more pieces of to-be-associated biological feature data that are received, creates a data file corresponding to the account information, and stores the data file in the database. Because the account information is associated with the biological feature data, an application can identify the biological information of the target user to obtain the account information associated with the biological information. A tedious account number does not need to be entered, the target user does not need to carry the terminal, and it is more direct and convenient and faster for the application to find the account information.

In an embodiment, to enable another user to identify biological information of a current user to obtain account information associated with the biological information, the current user may also send, by using the terminal, to-be-associated biological feature data extracted from to-be-associated biological information of the current user and the account information of the current user to the server for association. Specifically, the server receives the account information of the current user and the to-be-associated biological feature data that are sent by the terminal of the current user, uses the to-be-associated biological feature data as a biological feature data sample, associates the biological feature data sample with the account information of the current user, and stores, in the database, the biological feature data sample and the account information of the current user that are associated.

Figure 8:
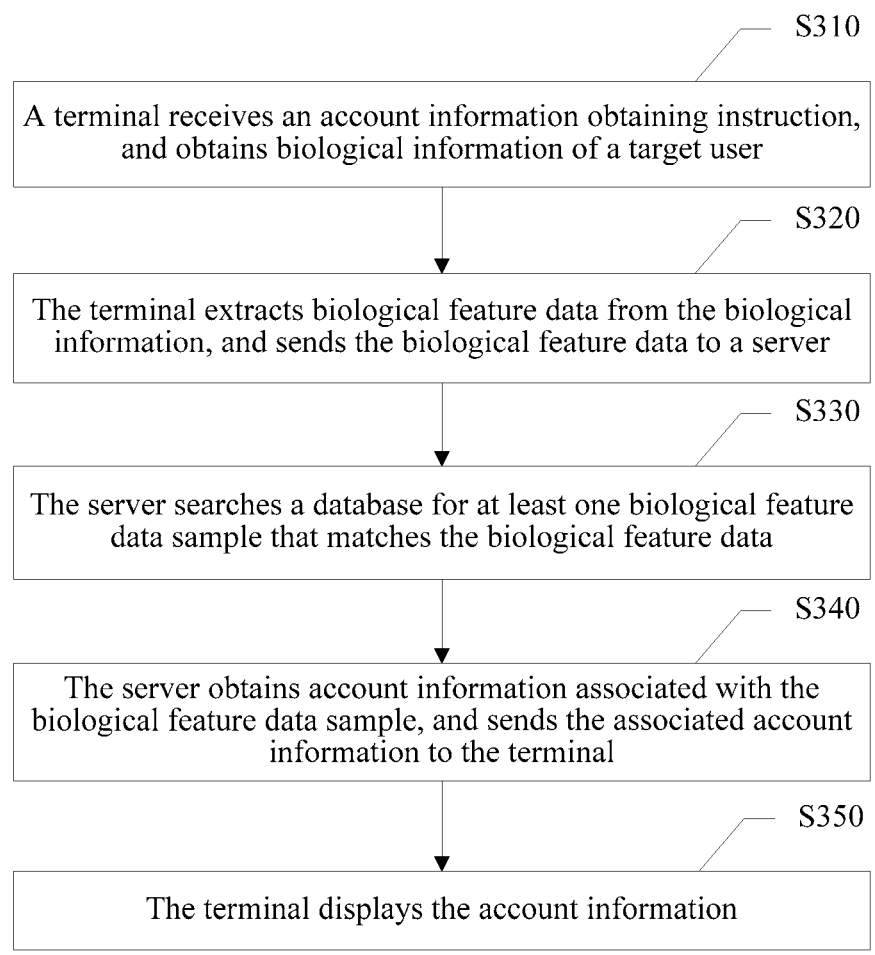
FIG. 8 is a flowchart of an account information obtaining method implemented by using a system according to an embodiment of the present invention.

FIG. 8 is a flowchart of an account information obtaining method implemented by using a system according to an embodiment of the present invention. As shown in FIG. 8, the account information obtaining method provided in this embodiment includes:

Step S310: A terminal receives an account information obtaining instruction, and obtains biological information of a target user.

In this embodiment, a current user may select a "scan" operation control among function options of an application, to trigger the account information obtaining instruction. Alternatively, an "obtain target user biological information" control is preset in an account information view window, and a current user may select the "obtain target user biological information" control, to trigger the account information obtaining instruction. The biological information may include one or a combination of face image information, fingerprint information, iris information, and voice information, and the preset "obtain target user biological information" control may include photographing, recording, and other controls. There are many manners for obtaining the biological information of the target user. For example, stored biological information of the target user, including a face picture, a fingerprint picture, an iris picture, a voice recording, and the like, is directly selected from a memory of the terminal. Alternatively, biological information of the target user, such as a face picture, a fingerprint picture, or an iris picture, is photographed by using a camera. Alternatively, voice of the target user is received by using a microphone. Alternatively, a camera shoots a video of the target user, and then a face picture that can clearly reflect features of the five sense organs of the target user, or a fingerprint picture reflecting a fingerprint feature, or an iris picture reflecting an iris feature is extracted from the video, or voice of the target person is extract from the video.

Step S320: The terminal extracts biological feature data from the biological information, and sends the biological feature data to a server.

A biological information identification program in the terminal may identify the obtained biological information, and extract clear biological feature data. The biological feature data may include features of the five sense organs, a facial form, a fingerprint pattern, an iris feature, a voice frequency, a tone, and the like. If the biological feature data in the biological information is not clear enough, the program may prompt the user that the identification and extraction fail, request the user to re-obtain biological information, and return to an interface for obtaining the biological information of the target user. After the biological feature data extraction is completed, the terminal sends the biological feature data to an application server by using the Internet. To improve application security, the biological feature data may be encrypted before sent, and then uploaded to the server.

Step S330: The server searches a database for at least one biological feature data sample that matches the biological feature data.

If the biological feature data received from the terminal are encrypted data, the server first performs decryption processing on the encrypted data. The database of the server stores a large number of biological feature data samples, and one or more biological feature data sample are associated with one piece of account information. The server searches for a matched biological feature data sample according to the biological feature data uploaded by the terminal. As long as the target user has associated the biological information of the target user with account information of the target user in advance, the server can find a matched biological feature data sample. Considering that people may look similar, there may be more than one search result.

Step S340: The server obtains account information associated with the biological feature data sample, and sends the associated account information to the terminal.

When only one matched biological feature data sample is found, the server searches the database for account information associated with the biological feature data sample. When multiple matched biological feature data samples are found, the server searches account information associated with all the matched biological feature data samples one by one. The server returns one or more pieces of associated account information that are found to the terminal by using a network. The current user determines, according to the returned account information, whether there is account information of the target user. If the server finds no matched biological feature data sample according to the biological feature data, the server returns match failure information to the terminal, to prompt the current user to re-obtain biological information.

Step S350: The terminal displays the account information.

After receiving the account information, the terminal displays the account information on an account information query interface, so that the user manually adds the target user. The account information may include information about a target user to be added, such as an account number, a nickname, a brief introduction, and a photo. The current user determines, according to the displayed account information, whether there is an expected target user. If the current user does not find account information of an expected target user in the displayed account information, current addition is canceled, and biological information is re-obtained.

In this embodiment, biological information of a target user is identified to obtain account information associated with the biological information. A tedious account number does not need to be entered, the target user does not need to carry a terminal, and the association between the biological information and the account information makes it more direct and convenient and faster for an application to find the account information.

Figure 9:
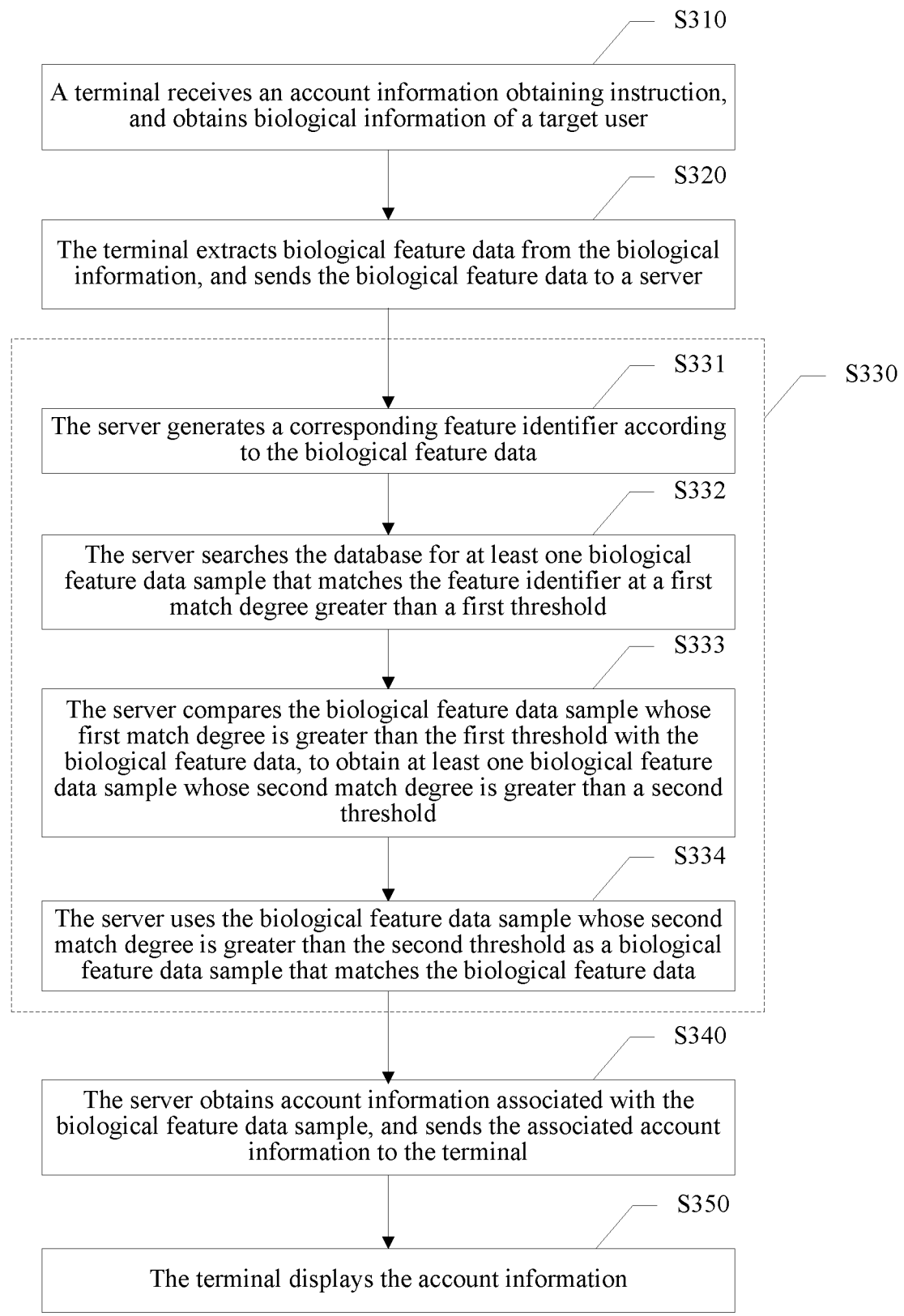
FIG. 9 is a flowchart of an account information obtaining method implemented by using a system according to an embodiment of the present invention.

FIG. 9 is a flowchart of an account information obtaining method implemented by using a system according to an embodiment of the present invention. As shown in FIG. 9, this embodiment includes all the steps in the embodiment shown in FIG. 8, and describes in detail the step of searching for a biological feature data sample that matches the biological feature data. Therefore, step S330 includes:

Step S331: The server generates a corresponding feature identifier according to the biological feature data.

In this embodiment, to improve a match speed, the server first performs, in advance in a fast match manner, preliminary screening on the large number of biological feature data samples in the database, to narrow a match range. Using face feature data as an example, the server extracts several key coordinates in the face feature data (for example, coordinates of the five sense organs or coordinates of the face contour), and generates a feature identifier (for example, a character string consisting of values of the coordinates); or extracts shape and size data of several features in the face feature data (for example, a facial form includes a round face, a square face, and an oval face, shapes of the five sense organs include round eyes, seamed eyes, a small mouse, a big mouse, a low bridged nose, and a high bridged nose), and generates a feature identifier (for example, a particular character is used to represent a feature of a shape, and characters of multiple features form a character string).

Step S332: The server searches the database for at least one biological feature data sample that matches the feature identifier at a first match degree greater than a first threshold.

For a biological feature data sample in the database, the server may also use the foregoing manner to generate a sample feature identifier, compare the sample feature identifier with the to-be-matched feature identifier, to obtain a first match degree, and when the first match degree is higher than a preset first threshold, for example, the sample feature identifier is similar to the to-be-matched feature identifier more than 80%, retain the biological feature data sample for subsequent detailed comparison.

Step S333: The server compares the biological feature data sample whose first match degree is greater than the first threshold with the biological feature data, to obtain at least one biological feature data sample whose second match degree is greater than a second threshold.

Step S334: The server uses the biological feature data sample whose second match degree is greater than the second threshold as a biological feature data sample that matches the biological feature data.

After the range is narrowed, a detailed comparison manner is used. For example, biological feature data samples obtained after the preliminary screening are compared with the biological feature data sent by the terminal one by one by using a face recognition technology, a fingerprint recognition technology, an iris recognition technology, or a voice recognition technology, to search for a biological feature data sample having a higher similarity degree respect to the biological feature data. Considering that it is impossible for the user to photograph identical pictures when photographing face pictures, fingerprint pictures, or iris pictures of the target user, or during obtaining of voice of the target user, voice of the target user may be different from that before, which may be caused by impact from an external environment or impact from the target user, in this embodiment, the second threshold is used as a comparison criterion, and when the second match degree is higher than the second threshold, for example, higher than 95%, it is considered that the biological feature data sample matches the biological feature data sent by the terminal.

In this embodiment, a server first uses a fast match manner to perform preliminary screening, which narrows a match range, and improves a match speed, and then the server uses a detailed comparison manner to obtain a biological feature data sample having a great similarity degree, making match more accurate.

Figure 10:
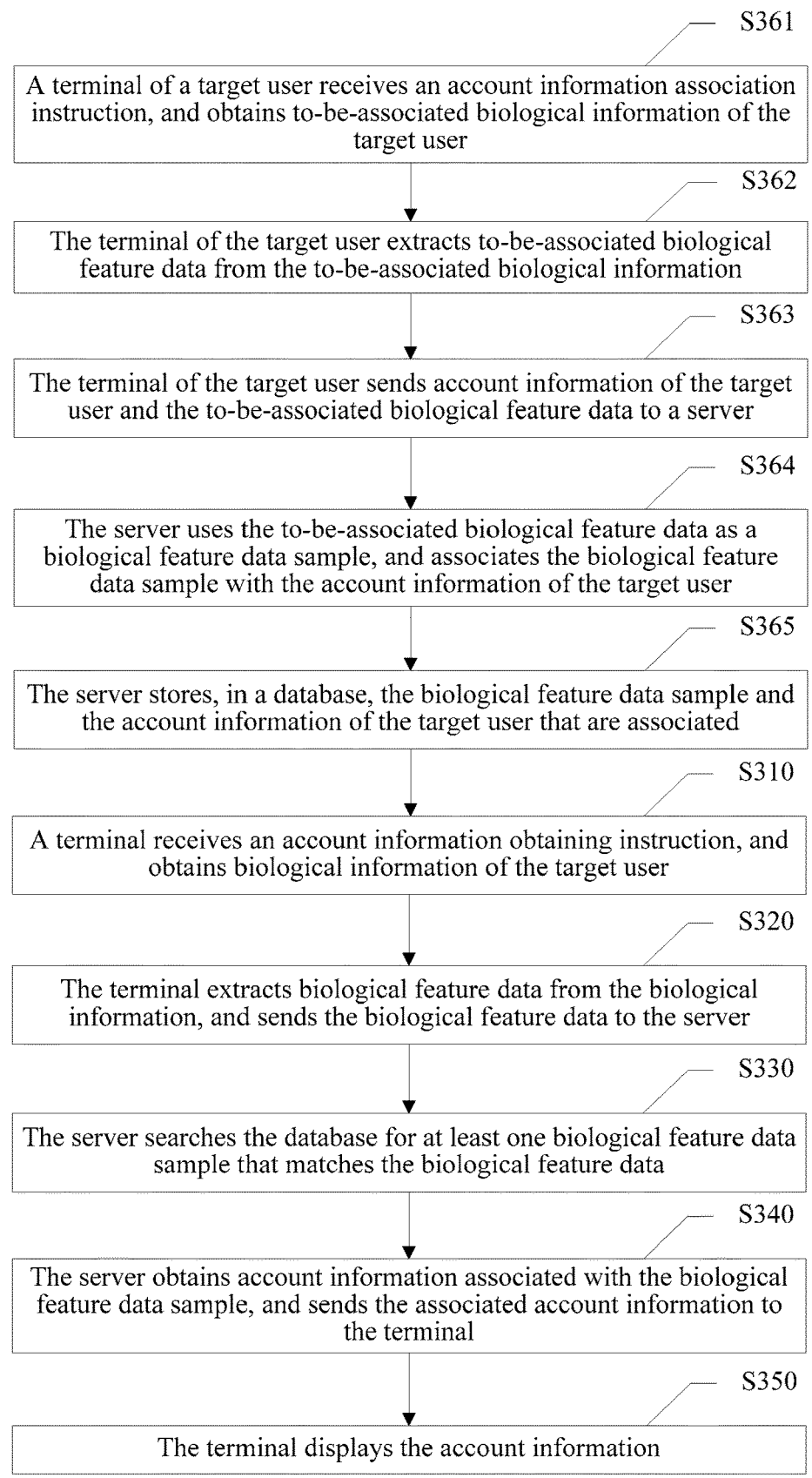
FIG. 10 is a flowchart of an account information obtaining method implemented by using a system according to an embodiment of the present invention.

FIG. 10 is a flowchart of an account information obtaining method implemented by using a system according to an embodiment of the present invention. As shown in FIG. 10, this embodiment includes all the steps in the embodiment shown in FIG. 8, and to enable the current user to identify the biological information of the target user to search for the account information of the target user, before step S310, further includes a step of associating the account information of the target user with the biological feature data of the target user, which specifically includes:

Step S361: A terminal of the target user receives an account information association instruction, and obtains to-be-associated biological information of the target user.

In this embodiment, to enable another user to identify the biological information of the target user to obtain account information associated with the biological information, the terminal of the target user first needs to associate the biological information of the target user with the account information of the target user. A biological information association operation control is preset on an application interface, and the account information association instruction is triggered after the user selects the control. Alternatively, the account information association instruction may be directly triggered by using a "scan" control. To distinguish from the account information obtaining instruction, after the user selects the "scan" control and biological information is obtained, a selection menu including a "search for account information" option and an "associate account information" option is popped. When the user selects the "search for account information" option, the account information obtaining instruction is triggered. When the user selects the "associate account information" option, the account information association instruction is triggered. The manner for obtaining the to-be-associated biological information may be the same as the manner for obtaining the biological information of the target user in the foregoing embodiment. For example, biological information of the user is directly selected from a memory of the terminal. Alternatively, biological information of the user, such as the face, a fingerprint, or an iris, is photographed by using a camera. Alternatively, voice of the user is received by using a microphone. Alternatively, a camera shoots a video of the user, and then face information that can most clearly reflect the five sense organs of the user, fingerprint information, iris information, or voice information is extract from the video.

Step S362: The terminal of the target user extracts to-be-associated biological feature data from the to-be-associated biological information.

To make subsequent biological information search and match processes simpler and faster, multiple pieces of to-be-associated biological information may be provided during account information association. For example, face images photographed at different angles are provided, which can reflect three-dimensional face features of the user more comprehensively. A biological information identification program in the terminal identifies the to-be-associated biological, and extracts clear biological feature data. The biological feature data may include features of the five sense organs, a facial form, a fingerprint, an iris, a voice frequency, a tone, and the like. If there are multiple pieces of to-be-associated biological information, multiple pieces of biological feature data are extracted correspondingly. If a feature in the biological information is not clear enough, the program may prompt the user that the identification and extraction fail, request the user to re-obtain biological information, and return to an interface for obtaining to-be-associated biological information.

Step S363: The terminal of the target user sends the account information of the target user and the to-be-associated biological feature data to the server.

After the biological feature data extraction is completed, the target user sends the account information of the target user and the to-be-associated biological feature data to the application server by using the terminal, and the server associates the account information of the target user and the biological feature data and stores them.

Step S364: The server uses the to-be-associated biological feature data as a biological feature data sample, and associates the biological feature data sample with the account information of the target user.

Step S365: The server stores, in the database, the biological feature data sample and the account information of the target user that are associated.

The server associates the account information and one or more pieces of to-be-associated biological feature data that are received, creates a data file corresponding to the account information, and stores the data file in the database. If there are multiple pieces of to-be-associated biological feature data, the multiple pieces of biological feature data are all associated with account information of a same user. The multiple pieces of biological feature data reflect biological information of the same user, making subsequent match more accurate. Because the account information is associated with the biological feature data, an application can identify the biological information of the target user to obtain the account information associated with the biological information. A tedious account number does not need to be entered, the target user does not need to carry the terminal, and it is more direct and convenient and faster for the application to find the account information.

In an embodiment, to enable another user to identify biological information of the current user to search for account information of the current user, the biological information of the current user may be associated with the account information of the current user. Specifically, the terminal of the current user receives an account information association instruction, obtains to-be-associated biological information of the current user, extracts biological feature data from the to-be-associated biological information, and sends the account information of the current user and the biological feature data extracted from the to-be-associated biological information to the server. Then the server uses the to-be-associated biological feature data as a biological feature data sample, associates the account information of the current user with the biological feature data sample, and stores, in the database, the biological feature data sample and the account information of the current user that are associated.

Figure 11:
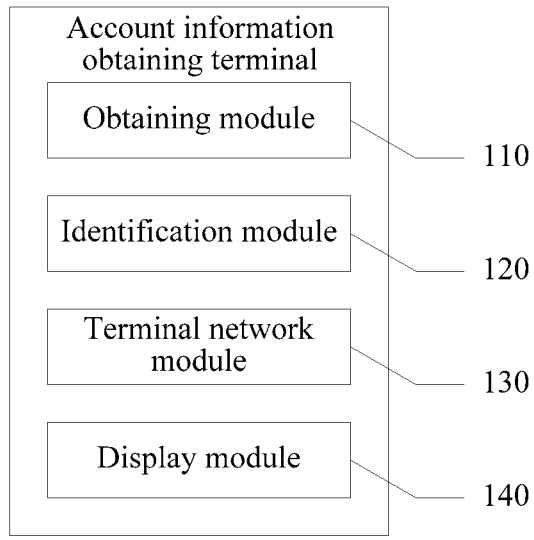
FIG. 11 is a schematic structural diagram of an account information obtaining terminal according to an embodiment of the present invention.

FIG. 11 is a schematic structural diagram of an account information obtaining terminal according to an embodiment of the present invention. As shown in FIG. 11, the account information obtaining terminal provided in this embodiment includes:

an obtaining module 110, configured to receive an account information obtaining instruction, and obtain biological information of a target user;

an identification module 120, configured to extract biological feature data from the biological information;

a terminal network module 130, configured to send the biological feature data to a server; and receive account information that is sent by the server and that is associated with at least one biological feature data sample matching the biological feature data; and a display module 140, configured to display the account information.

In some embodiments, the account information obtaining terminal also includes a contact module, configured to add the account information to a contact list of the current user's account at the social networking application in response to a selection of the account information by the current user of the terminal, so that the current user can communicate with the target user directly. In this embodiment, a current user may select a "scan" operation control among function options of an application, to trigger the account information obtaining instruction. Alternatively, an "obtain target user biological information" control is preset in an account information view window, and a current user may select the "obtain target user biological information" control, to trigger the account information obtaining instruction. The biological information may include one or a combination of face image information, fingerprint information, iris information, and voice information, and the preset "obtain target user biological information" control may include photographing, recording, and other controls. There are many manners for obtaining the biological information of the target user. For example, stored biological information of the target user, including a face picture, a fingerprint picture, an iris picture, a voice recording, and the like, is directly selected from a memory of the terminal. Alternatively, biological information of the target user, such as a face picture, a fingerprint picture, or an iris picture, is photographed by using a camera. Alternatively, voice of the target user is received by using a microphone. Alternatively, a camera shoots a video of the target user, and then a face picture that can clearly reflect features of the five sense organs of the target user, or a fingerprint picture reflecting a fingerprint feature, or an iris picture reflecting an iris feature is extracted from the video, or voice of the target person is extract from the video.

A biological information identification program in the terminal may identify the obtained biological information, and extract clear biological feature data. The biological feature data may include features of the five sense organs, a facial form, a fingerprint pattern, an iris feature, a voice frequency, a tone, and the like. If the biological feature data in the biological information is not clear enough, the program may prompt the user that the identification and extraction fail, request the user to re-obtain biological information, and return to an interface for obtaining the biological information of the target user. After the biological feature data extraction is completed, the terminal sends the biological feature data to an application server by using the Internet. To improve application security, the biological feature data may be encrypted before sent, and then uploaded to the server.

The server stores a large number of biological feature data samples, and one or more biological feature data sample are associated with one piece of account information. The server searches for a matched biological feature data sample according to the biological feature data uploaded by the terminal. As long as the target user has associated the biological information of the target user with account information of the target user in advance, the server can find a matched biological feature data sample. Considering that people may look similar, there may be more than one search result. The server returns account information associated with the matched biological feature data sample to the terminal. If there is only one matched biological feature data sample, the server returns one piece of account information. If there are multiple matched biological feature data samples, the server returns account information associated with all the matched biological feature data samples to the terminal. If the server finds no matched biological feature data sample according to the biological feature data, the server returns match failure information to the terminal, to prompt the current user to re-obtain biological information. After receiving the account information, the terminal displays the account information on an account information query interface for view by the current user. The account information may include information about a target user to be added, such as an account number, a nickname, a brief introduction, and a photo. The current user determines, according to the displayed account information, whether there is an expected target user. If the current user does not find account information of an expected target user in the displayed account information, current addition is canceled, and biological information is re-obtained.

In this embodiment, biological information of a target user is identified to obtain account information associated with the biological information. A tedious account number does not need to be entered, the target user does not need to carry a terminal, and the association between the biological information and the account information makes it more direct and convenient and faster for an application to find the account information.

In an embodiment, the obtaining module 110 is further configured to receive an account information association instruction, and obtain to-be-associated biological information of the current user; the identification module 120 is further configured to extract to-be-associated biological feature data from the to-be-associated biological information; and the terminal network module 130 is further configured to send account information of the current user and the to-be-associated biological feature data to the server for association. By means of the processing performed by the modules, the account information of the current user can be associated with the biological feature data of the current user. This helps another to identify biological information of the current user to search for the account information of the current user.

In this embodiment, to enable another user to identify the biological information of the target user to obtain account information associated with the biological information, the terminal of the target user first needs to associate the biological information of the target user with the account information of the target user. A biological information association operation control is preset on an application interface, and the account information association instruction is triggered after the user selects the control. Alternatively, the account information association instruction may be directly triggered by using a "scan" control. To distinguish from the account information obtaining instruction, after the user selects the "scan" control and biological information is obtained, a selection menu including a "search for account information" option and an "associate account information" option is popped. When the user selects the "search for account information" option, the account information obtaining instruction is triggered. When the user selects the "associate account information" option, the account information association instruction is triggered. The manner for obtaining the to-be-associated biological information may be the same as the manner for obtaining the biological information of the target user in the foregoing embodiment. For example, biological information of the user is directly selected from a memory of the terminal. Alternatively, biological information of the user, such as the face, a fingerprint, or an iris, is photographed by using a camera. Alternatively, voice of the user is received by using a microphone. Alternatively, a camera shoots a video of the user, and then face information that can most clearly reflect the five sense organs of the user, fingerprint information, iris information, or voice information is extract from the video.

To make subsequent biological information search and match processes simpler and faster, multiple pieces of to-be-associated biological information may be provided during account information association. For example, face images photographed at different angles are provided, which can reflect three-dimensional face features of the user more comprehensively. A biological information identification program in the terminal identifies the to-be-associated biological, and extracts clear biological feature data. The biological feature data may include features of the five sense organs, a facial form, a fingerprint, an iris, a voice frequency, a tone, and the like. If there are multiple pieces of to-be-associated biological information, multiple pieces of biological feature data are extracted correspondingly. If a feature in the biological information is not clear enough, the program may prompt the user that the identification and extraction fail, request the user to re-obtain biological information, and return to an interface for obtaining to-be-associated biological information.

After the biological feature data extraction is completed, the target user sends the account information of the target user and the to-be-associated biological feature data to the application server by using the terminal, and the server associates the account information of the target user and the biological feature data and stores them. If there are multiple pieces of to-be-associated biological feature data, the multiple pieces of biological feature data are all associated with account information of a same user. The multiple pieces of biological feature data reflect biological information of the same user, making subsequent match more accurate.

Figure 12:
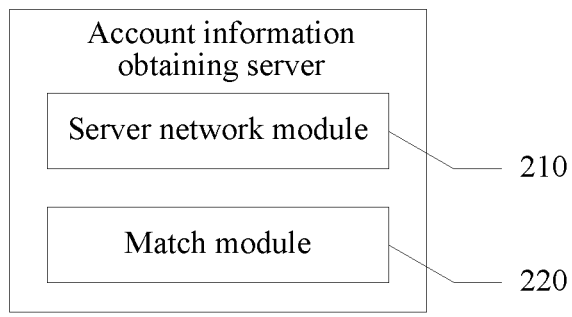
FIG. 12 is a schematic structural diagram of an account information obtaining server according to an embodiment of the present invention.

FIG. 12 is a schematic structural diagram of an account information obtaining server according to an embodiment of the present invention. As shown in FIG. 12, the account information obtaining server provided in this embodiment includes:

a server network module 210, configured to receive biological feature data of a target user that is sent by a terminal; and send associated account information to the terminal for display; and a match module 220, configured to search a database for at least one biological feature data sample that matches the biological feature data; and obtain the account information associated with the biological feature data sample.

In this embodiment, after receiving biological feature data sent by a terminal, an application server searches a database for account information associated with the biological feature data. If the biological feature data received from the terminal are encrypted data, the server first performs decryption processing on the encrypted data.

The database of the server stores a large number of biological feature data samples, and one or more biological feature data sample are associated with one piece of account information. The server searches for a matched biological feature data sample according to the biological feature data uploaded by the terminal. As long as the target user has associated the biological information of the target user with account information of the target user in advance, the server can find a matched biological feature data sample. Considering that people may look similar, there may be more than one search result.

When only one matched biological feature data sample is found, the server searches the database for account information associated with the biological feature data sample. When multiple matched biological feature data samples are found, the server searches account information associated with all the matched biological feature data samples one by one.

The server returns one or more pieces of associated account information that are found to the terminal by using a network. A current user determines, according to the returned account information, whether there is account information of an expected target user. If the server finds no matched biological feature data sample according to the biological feature data, the server returns match failure information to the terminal, to prompt the current user to re-obtain biological information.

In this embodiment, a server searches for account information associated with biological information of a target user. A current user does not need to enter a tedious account number, the target user does not need to carry a terminal, and the association between the biological information and the account information makes it more direct and convenient and faster for an application to find the account information.

In an embodiment, the match module 220 is further configured to:

generate a corresponding feature identifier according to the biological feature data;

search the database for at least one biological feature data sample that matches the feature identifier at a first match degree greater than a first threshold;

compare the biological feature data sample whose first match degree is greater than the first threshold with the biological feature data, to obtain at least one biological feature data sample whose second match degree is greater than a second threshold; and use the biological feature data sample whose second match degree is greater than the second threshold as a biological feature data sample that matches the biological feature data. Therefore, the match module 220 can find a biological feature data sample that matches the biological feature data.

In this embodiment, to improve a match speed, the server first performs, in advance in a fast match manner, preliminary screening on the large number of biological feature data samples in the database, to narrow a match range. Using face feature data as an example, the server extracts several key coordinates in the face feature data (for example, coordinates of the five sense organs or coordinates of the face contour), and generates a feature identifier (for example, a character string consisting of values of the coordinates); or extracts shape and size data of several features in the face feature data (for example, a facial form includes a round face, a square face, and an oval face, shapes of the five sense organs include round eyes, seamed eyes, a small mouse, a big mouse, a low bridged nose, and a high bridged nose), and generates a feature identifier (for example, a particular character is used to represent a feature of a shape, and characters of multiple features form a character string).

For a biological feature data sample in the database, the server may also use the foregoing manner to generate a sample feature identifier, compare the sample feature identifier with the to-be-matched feature identifier, to obtain a first match degree, and when the first match degree is higher than a preset first threshold, for example, the sample feature identifier is similar to the to-be-matched feature identifier more than 80%, retain the biological feature data sample for subsequent detailed comparison.

After the range is narrowed, a detailed comparison manner is used. For example, biological feature data samples obtained after the preliminary screening are compared with the biological feature data sent by the terminal one by one by using a face recognition technology, a fingerprint recognition technology, an iris recognition technology, or a voice recognition technology, to search for a biological feature data sample having a higher similarity degree respect to the biological feature data. Considering that it is impossible for the user to photograph identical pictures when photographing face pictures, fingerprint pictures, or iris pictures of the target user, or during obtaining of voice of the target user, voice of the target user may be different from that before, which may be caused by impact from an external environment or impact from the target user, in this embodiment, the second threshold is used as a comparison criterion, and when the second match degree is higher than the second threshold, for example, higher than 95%, it is considered that the biological feature data sample matches the biological feature data sent by the terminal.

In this embodiment, a server first uses a fast match manner to perform preliminary screening, which narrows a match range, and improves a match speed, and then the server uses a detailed comparison manner to obtain a biological feature data sample having a great similarity degree, making match more accurate.

Figure 13:
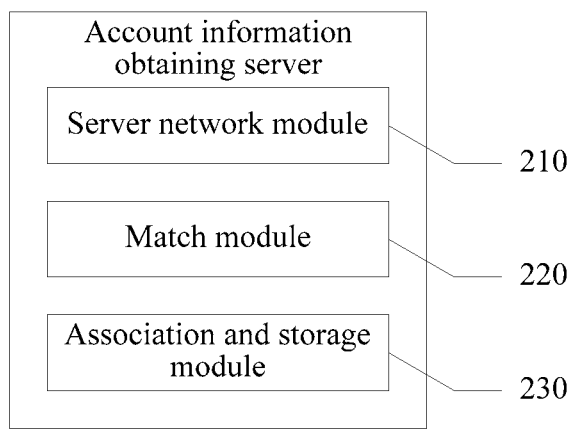
FIG. 13 is a schematic structural diagram of an account information obtaining server according to an embodiment of the present invention.

FIG. 13 is a schematic structural diagram of an account information obtaining server according to an embodiment of the present invention. As shown in FIG. 13, this embodiment includes all the modules in the embodiment shown in FIG. 12. To enable a current user to identify the biological information of the target user to search for the account information of the target user, the account information of the target user may be associated with the biological feature data of the target user. Therefore, the server is further provided with an association and storage module 230, where the server network module 210 is further configured to receive account information of the target user and to-be-associated biological feature data that are sent by a terminal of the target user; and the association and storage module 230 is configured to use the to-be-associated biological feature data as a biological feature data sample, and associate the biological feature data sample with the account information of the target user; and store, in the database, the biological feature data sample and the account information of the target user that are associated.

In this embodiment, to enable another user to identify the biological information of the target user to obtain the account information associated with the biological information, the target user first needs to send, by using a terminal, to-be-associated biological feature data extracted from to-be-associated biological information of the target user and the account information of the target user to the server for association. To make subsequent biological information search and match processes simpler and faster, the terminal may provide one piece of account information and multiple pieces of to-be-associated biological feature data to the server. The multiple pieces of biological feature data reflect biological information of the same user, making subsequent match more accurate. The server associates the account information and the one or more pieces of to-be-associated biological feature data that are received, creates a data file corresponding to the account information, and stores the data file in the database. Because the account information is associated with the biological feature data, an application can identify the biological information of the target user to obtain the account information associated with the biological information. A tedious account number does not need to be entered, the target user does not need to carry the terminal, and it is more direct and convenient and faster for the application to find the account information.

In an embodiment, to enable another user to identify biological information of the current user to search for account information of the current user, the account information of the current user may also be associated with biological feature data of the current user. Specifically, the server network module 210 is further configured to receive the account information of the current user and to-be-associated biological feature data that are sent by the terminal of the current user; and the association and storage module 230 is configured to use the to-be-associated biological feature data as a biological feature data sample, associate the biological feature data sample with the account information of the current user, and store, in the database, the biological feature data sample and the account information of the current user that are associated.

An embodiment of the present invention further provides an account information obtaining system. Referring to FIG. 1, the system includes a terminal 100 and a server 200, the terminal 100 being configured to receive an account information obtaining instruction, obtain biological information of a target user, extract biological feature data from the biological information, send the biological feature data to the server 200; and display associated account information; and the server 200 being configured to search a database for at least one biological feature data sample that matches the biological feature data; obtain the account information associated with the biological feature data sample, and send the associated account information to the terminal 100.

In this embodiment, a current user may select a "scan" operation control among function options of an application, to trigger the account information obtaining instruction. Alternatively, an "obtain target user biological information" control is preset in an account information view window, and a current user may select the "obtain target user biological information" control, to trigger the account information obtaining instruction. The biological information may include one or a combination of face image information, fingerprint information, iris information, and voice information, and the preset "obtain target user biological information" control may include photographing, recording, and other controls. There are many manners for obtaining the biological information of the target user. For example, stored biological information of the target user, including a face picture, a fingerprint picture, an iris picture, a voice recording, and the like, is directly selected from a memory of the terminal. Alternatively, biological information of the target user, such as a face picture, a fingerprint picture, or an iris picture, is photographed by using a camera. Alternatively, voice of the target user is received by using a microphone. Alternatively, a camera shoots a video of the target user, and then a face picture that can clearly reflect features of the five sense organs of the target user, or a fingerprint picture reflecting a fingerprint feature, or an iris picture reflecting an iris feature is extracted from the video, or voice of the target person is extract from the video.

A biological information identification program in the terminal may identify the obtained biological information, and extract clear biological feature data. The biological feature data may include features of the five sense organs, a facial form, a fingerprint pattern, an iris feature, a voice frequency, a tone, and the like. If the biological feature data in the biological information is not clear enough, the program may prompt the user that the identification and extraction fail, request the user to re-obtain biological information, and return to an interface for obtaining the biological information of the target user. After the biological feature data extraction is completed, the terminal sends the biological feature data to an application server by using the Internet. To improve application security, the biological feature data may be encrypted before sent, and then uploaded to the server.

If the biological feature data received from the terminal are encrypted data, the server first performs decryption processing on the encrypted data. The database of the server stores a large number of biological feature data samples, and one or more biological feature data sample are associated with one piece of account information. The server searches for a matched biological feature data sample according to the biological feature data uploaded by the terminal. As long as the target user has associated the biological information of the target user with account information of the target user in advance, the server can find a matched biological feature data sample. Considering that people may look similar, there may be more than one search result.

When only one matched biological feature data sample is found, the server searches the database for account information associated with the biological feature data sample. When multiple matched biological feature data samples are found, the server searches account information associated with all the matched biological feature data samples one by one. The server returns one or more pieces of associated account information that are found to the terminal by using a network. The current user determines, according to the returned account information, whether there is account information of the target user. If the server finds no matched biological feature data sample according to the biological feature data, the server returns match failure information to the terminal, to prompt the current user to re-obtain biological information.

After receiving the account information, the terminal displays the account information on an account information query interface, so that the user manually adds the target user. The account information may include information about a target user to be added, such as an account number, a nickname, a brief introduction, and a photo. The current user determines, according to the displayed account information, whether there is an expected target user. If the current user does not find account information of an expected target user in the displayed account information, current addition is canceled, and biological information is re-obtained.

In this embodiment, biological information of a target user is identified to obtain account information associated with the biological information. A tedious account number does not need to be entered, the target user does not need to carry a terminal, and the association between the biological information and the account information makes it more direct and convenient and faster for an application to find the account information.

In an embodiment, the server 200 is further configured to: generate a corresponding feature identifier according to the biological feature data; search the database for at least one biological feature data sample that matches the feature identifier at a first match degree greater than a first threshold; compare the biological feature data sample whose first match degree is greater than the first threshold with the biological feature data, to obtain at least one biological feature data sample whose second match degree is greater than a second threshold; and use the biological feature data sample whose second match degree is greater than the second threshold as a biological feature data sample that matches the biological feature data. By means of the processing, the server 200 can find a matched biological feature data sample.

In this embodiment, to improve a match speed, the server first performs, in advance in a fast match manner, preliminary screening on the large number of biological feature data samples in the database, to narrow a match range. Using face feature data as an example, the server extracts several key coordinates in the face feature data (for example, coordinates of the five sense organs or coordinates of the face contour), and generates a feature identifier (for example, a character string consisting of values of the coordinates); or extracts shape and size data of several features in the face feature data (for example, a facial form includes a round face, a square face, and an oval face, shapes of the five sense organs include round eyes, seamed eyes, a small mouse, a big mouse, a low bridged nose, and a high bridged nose), and generates a feature identifier (for example, a particular character is used to represent a feature of a shape, and characters of multiple features form a character string).

For a biological feature data sample in the database, the server may also use the foregoing manner to generate a sample feature identifier, compare the sample feature identifier with the to-be-matched feature identifier, to obtain a first match degree, and when the first match degree is higher than a preset first threshold, for example, the sample feature identifier is similar to the to-be-matched feature identifier more than 80%, retain the biological feature data sample for subsequent detailed comparison.

After the range is narrowed, a detailed comparison manner is used. For example, biological feature data samples obtained after the preliminary screening are compared with the biological feature data sent by the terminal one by one by using a face recognition technology, a fingerprint recognition technology, an iris recognition technology, or a voice recognition technology, to search for a biological feature data sample having a higher similarity degree respect to the biological feature data. Considering that it is impossible for the user to photograph identical pictures when photographing face pictures, fingerprint pictures, or iris pictures of the target user, or during obtaining of voice of the target user, voice of the target user may be different from that before, which may be caused by impact from an external environment or impact from the target user, in this embodiment, the second threshold is used as a comparison criterion, and when the second match degree is higher than the second threshold, for example, higher than 95%, it is considered that the biological feature data sample matches the biological feature data sent by the terminal.

In this embodiment, a server first uses a fast match manner to perform preliminary screening, which narrows a match range, and improves a match speed, and then the server uses a detailed comparison manner to obtain a biological feature data sample having a great similarity degree, making match more accurate.

In an embodiment, the terminal 100 is further configured to receive an account information association instruction, obtain to-be-associated biological information of a current user, and extract to-be-associated biological feature data from the to-be-associated biological information; and send account information of the current user and the to-be-associated biological feature data to the server 200; and the server 200 is further configured to use the to-be-associated biological feature data as a biological feature data sample, and associate the biological feature data sample with the account information of the current user; and store, in the database, the biological feature data sample and the account information of the current user that are associated.

By means of the processing performed by the terminal 100 and the server 200, the account information of the current user can be associated with the biological feature data of the current user.

In this embodiment, to enable another user to identify the biological information of the target user to obtain account information associated with the biological information, the terminal of the target user first needs to associate the biological information of the target user with the account information of the target user. A biological information association operation control is preset on an application interface, and the account information association instruction is triggered after the user selects the control. Alternatively, the account information association instruction may be directly triggered by using a "scan" control. To distinguish from the account information obtaining instruction, after the user selects the "scan" control and biological information is obtained, a selection menu including a "search for account information" option and an "associate account information" option is popped. When the user selects the "search for account information" option, the account information obtaining instruction is triggered. When the user selects the "associate account information" option, the account information association instruction is triggered. The manner for obtaining the to-be-associated biological information may be the same as the manner for obtaining the biological information of the target user in the foregoing embodiment. For example, biological information of the user is directly selected from a memory of the terminal. Alternatively, biological information of the user, such as the face, a fingerprint, or an iris, is photographed by using a camera. Alternatively, voice of the user is received by using a microphone. Alternatively, a camera shoots a video of the user, and then face information that can most clearly reflect the five sense organs of the user, fingerprint information, iris information, or voice information is extract from the video.

To make subsequent biological information search and match processes simpler and faster, multiple pieces of to-be-associated biological information may be provided during account information association. For example, face images photographed at different angles are provided, which can reflect three-dimensional face features of the user more comprehensively. A biological information identification program in the terminal identifies the to-be-associated biological, and extracts clear biological feature data. The biological feature data may include features of the five sense organs, a facial form, a fingerprint, an iris, a voice frequency, a tone, and the like. If there are multiple pieces of to-be-associated biological information, multiple pieces of biological feature data are extracted correspondingly. If a feature in the biological information is not clear enough, the program may prompt the user that the identification and extraction fail, request the user to re-obtain biological information, and return to an interface for obtaining to-be-associated biological information.

After the biological feature data extraction is completed, the user sends the account information of the user and the to-be-associated biological feature data to the application server by using the terminal, and the server associates the account information of the user and the biological feature data and stores them.

The server associates the account information and one or more pieces of to-be-associated biological feature data that are received, creates a data file corresponding to the account information, and stores the data file in the database. If there are multiple pieces of to-be-associated biological feature data, the multiple pieces of biological feature data are all associated with account information of a same user. The multiple pieces of biological feature data reflect biological information of the same user, making subsequent match more accurate. Because the account information is associated with the biological feature data, an application can identify the biological information of the target user to obtain the account information associated with the biological information. A tedious account number does not need to be entered, the target user does not need to carry the terminal, and it is more direct and convenient and faster for the application to find the account information.

Figure 14:
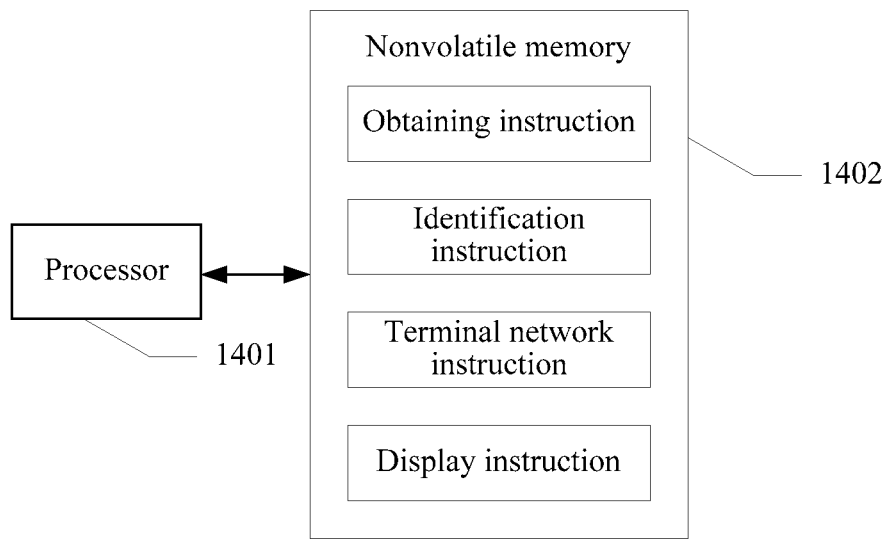
FIG. 14 is a schematic structural diagram of hardware of an account information obtaining terminal according to an embodiment of the present invention.

FIG. 14 is a schematic structural diagram of hardware of an account information obtaining terminal according to an embodiment of the present invention. As shown in FIG. 14, the terminal may include:

a processor 1401 (for example, a CPU) and a nonvolatile memory 1402, where the nonvolatile memory 1402 is configured to store a machine readable instruction, which includes an obtaining instruction, an identification instruction, a terminal network instruction, and a display instruction that can be executed by the processor 1401; and the processor 1401 is configured to read and execute the obtaining instruction, the identification instruction, the terminal network instruction, and the display instruction that are stored in the nonvolatile memory 1402, to implement functions of modules in the account information obtaining terminal shown in FIG. 11.

Figure 15:
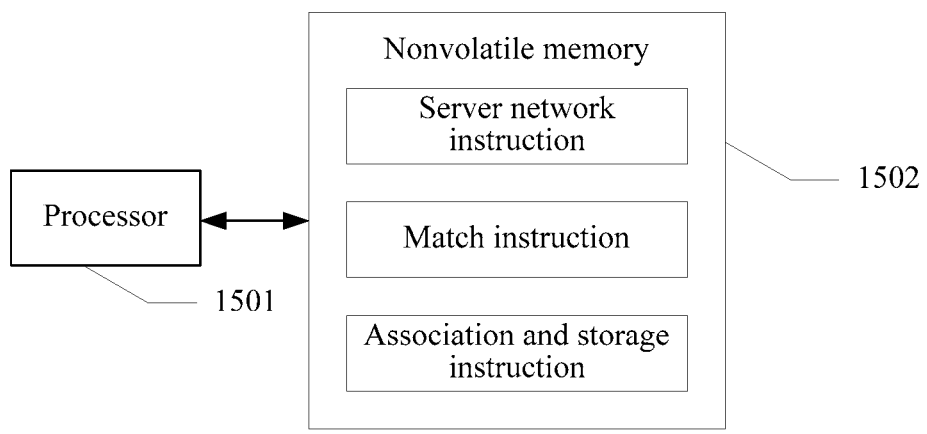
FIG. 15 is a schematic structural diagram of hardware of an account information obtaining server according to an embodiment of the present invention.

FIG. 15 is a schematic structural diagram of hardware of an account information obtaining server according to an embodiment of the present invention. As shown in FIG. 15, the server may include:

a processor 1501 (for example, a CPU) and a nonvolatile memory 1502, where the nonvolatile memory 1502 is configured to store a machine readable instruction, which includes a server network instruction, a match instruction, and an association and storage instruction that can be executed by the processor 1501; and the processor 1501 is configured to read and execute the server network instruction, the match instruction, and the association and storage instruction that are stored in the nonvolatile memory 1502, to implement functions of modules in the account information obtaining server shown in FIG. 12 and FIG. 13.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Unless otherwise specified, an element limited by "include a/an . . . " does not exclude other same elements existing in the process, the method, the article, or the device that includes the element.

The sequence numbers of the foregoing embodiments of the present invention are merely for description, and do not imply the preference among the embodiments.

Through the foregoing description of the implementation manners, it is clear to persons skilled in the art that the present disclosure may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in the form of a software product. The computer software product is stored in a storage medium (for example, a ROM/RAM, a magnetic disk, or an optical disc), and contains several instructions for instructing a terminal device (which may be a mobile phone, a computer, a server, or a network device) to perform the method according to the embodiments of the present invention.

The foregoing descriptions are merely preferred embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A method performed at a terminal having a camera, a microphone, one or more processors and memory storing programs to be executed by the one or more processors, wherein the terminal is associated with a user having a first user account at a social networking application, the method comprising:

in response to a request of the user, invoking the social networking application running on the terminal;

receiving, from the user via the social networking application, an instruction to obtain video and audio information of a target user having a second user account on the social networking application;

in response to the instruction:

obtaining the video and audio information of the target user via the camera, the microphone, and a stored program on the terminal;

extracting one or more image frames from the video information for generating facial characteristics of the target user; and extracting one or more sound frames from the audio information for generating acoustic fingerprints of the target user;

sending the facial characteristics and the acoustic fingerprints of the target user to a server of the social networking application;

receiving, from the server, account information of the second user account associated with the target user based on a match between biological features of users of the social networking application that are stored at the server and the facial characteristics and the acoustic fingerprints of the target user;

displaying the account information of the second user account associated with the target user on the terminal;

receiving, from the user, a selection of the account information of the second user account associated with the target user; and in response to the selection from the user, adding the account information of the second user account associated with the target user to the contact list of the user on the social networking application, including using one of the extracted image frames as an alias of the target user on the contact list, thereby enabling the user to communicate with the target user directly via the social networking application.

2. The method according to claim 1, further comprising: associating the account information of the target user with at least a subset of the video and audio information of the target user.

3. The method according to claim 1, wherein the facial characteristics comprise one or a combination of face image information, fingerprint information, iris information, and voice information.

4. The method according to claim 1, wherein the video and audio information of the target user are collected simultaneously by the terminal.

5. The method according to claim 1, wherein, upon receipt of the facial characteristics and the acoustic fingerprints of the target user, the server is configured to perform operations including:

searching a database for at least one data sample that matches the facial characteristics and the acoustic fingerprints of the target user;

obtaining information of an account associated with the at least one data sample; and returning the information to the terminal for display.

6. The method according to claim 5, wherein searching a database for at least data sample that matches the facial characteristics and the acoustic fingerprints of the target user comprises:

generating a feature identifier according to the facial characteristics and the acoustic fingerprints of the target user;

searching the database for a plurality of data samples that matches the feature identifier at a first match degree greater than a first threshold;

sending the plurality of data samples whose first match degree is greater than the first threshold with the facial characteristics and the acoustic fingerprints of the target user to the terminal for display to the current user, wherein the terminal is configured to return one of the plurality of data samples selected by the user; and using the selected data sample as a data sample that matches the facial characteristics and the acoustic fingerprints of the target user greater than a second threshold.

7. The method according to claim 5, wherein searching a database for at least data sample that matches the biological feature data comprises:

generating a feature identifier according to the facial characteristics and the acoustic fingerprints of the target user;

searching the database for at least one data sample that matches the feature identifier at a first match degree greater than a first threshold;

comparing the data sample whose first match degree is greater than the first threshold with the facial characteristics and the acoustic fingerprints of the target user, to obtain at least one data sample whose second match degree is greater than a second threshold; and using the data sample whose second match degree is greater than the second threshold as a data sample that matches the facial characteristics and the acoustic fingerprints of the target user.

8. The method according to claim 1, wherein the alias is different from biological feature data used by the target user for logging into the the second user account at the social networking application.

9. A terminal associated with a user having a first user account at a social networking application, comprising:
a camera;
a microphone;
one or more processors;
memory; and
a plurality of program modules;
wherein the plurality of program modules is stored in the memory and comprises instructions that, when executed by the one or more processors, cause the terminal to perform operations comprising:
in response to a request of the user, invoking the social networking application running on the terminal;
receiving, from the user via the social networking application, an instruction to obtain video and audio information of a target user having a second user account on the social networking application;
in response to the instruction:
obtaining the video and audio information of the target user via the camera, the microphone, and a stored program on the terminal;
extracting one or more image frames from the video information for generating facial characteristics of the target user; and
extracting one or more sound frames from the audio information for generating acoustic fingerprints of the target user;
sending the facial characteristics and the acoustic fingerprints of the target user to a server of the social networking application;
receiving, from the server, account information of the second user account associated with the target user based on a match between biological features of users of the social networking application that are stored at the server and the facial characteristics and the acoustic fingerprints of the target user;
displaying the account information of the second user account associated with the target user on the terminal;
receiving, from the user, a selection of the account information of the second user account associated with the target user; and
in response to the selection from the user, adding the account information of the second user account associated with the target user to the contact list of the user on the social networking application, including using one of the extracted image frames as an alias of the target user on the contact list, thereby enabling the user to communicate with the target user directly via the social networking application.

10. The terminal according to claim 9, wherein the alias is different from biological feature data used by the target user for logging into the the second user account at the social networking application.

11. The terminal according to claim 10, wherein the video and audio information of the target user are collected simultaneously by the terminal.

12. The terminal according to claim 9, wherein the facial characteristics comprise one or a combination of face image information, fingerprint information, iris information, and voice information.

13. The terminal according to claim 9, wherein the video and audio information of the target user are collected simultaneously by the terminal.

14. A non-transitory computer readable storage medium storing a plurality of computer executable instructions that, when executed by a terminal that has one or more processors and is associated with a user having a first user account at a social networking application, the terminal, cause the one or more processors to:
in response to a request of the user, invoke the social networking application running on the terminal;
receive, from the user via the social networking application, an instruction to obtain video and audio information of a target user having a second user account on the social networking application;
in response to the instruction:
obtain the video and audio information of the target user via the camera, the microphone, and a stored program on the terminal;
extract one or more image frames from the video information for generating facial characteristics of the target user; and
extract one or more sound frames from the audio information for generating acoustic fingerprints of the target user;
send the facial characteristics and the acoustic fingerprints of the target user to a server of the social networking application;
receive, from the server, account information of the second user account associated with of the target user based on a match between biological features of users of the social networking application that are stored at the server and the facial characteristics and the acoustic fingerprints of the target user;
display the account information of the second user account associated with the target user on the terminal;
receive, from the user, a selection of the account information of the second user account associated with the target user; and in response to the selection from the user, add the account information of the second user account associated with the target user to the contact list of the user on the social networking application, including using one of the extracted image frames as an alias of the target user on the contact list, thereby enabling the user to communicate with the target user directly via the social networking application.

15. The non-transitory computer readable storage medium according to claim 14, wherein the instructions cause the one or more processors to:
associate the account information of the target user with at least a subset of the video and audio information of the target user.

16. The non-transitory computer readable storage medium according to claim 15, wherein the video and audio information of the target user are collected simultaneously by the terminal.

17. The non-transitory computer readable storage medium according to claim 14, wherein the facial characteristics comprise one or a combination of face image information, fingerprint information, iris information, and voice information.

* * * * *